US007640917B2

(12) United States Patent
Daniel et al.

(10) Patent No.: US 7,640,917 B2
(45) Date of Patent: Jan. 5, 2010

(54) GAS DIRECT INJECTOR TIP SEAL

(75) Inventors: Gregory J. Daniel, Kettering, OH (US); Raymond Lee Szparagowski, Bowling Green, OH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 140 days.

(21) Appl. No.: 11/766,497

(22) Filed: Jun. 21, 2007

(65) Prior Publication Data

US 2008/0314365 A1 Dec. 25, 2008

(51) Int. Cl.
*F02M 61/14* (2006.01)
*F02F 11/00* (2006.01)
*F16J 15/34* (2006.01)
*F16J 15/02* (2006.01)

(52) U.S. Cl. ....................... 123/470; 277/313; 277/404; 277/591; 277/630; 277/946

(58) Field of Classification Search ................. 123/470; 277/313, 314, 404, 591, 592, 594, 628, 630, 277/644, 650, 910, 938, 935, 946
See application file for complete search history.

(56) References Cited

U.S. PATENT DOCUMENTS 3,540,746 A * 11/1970 Sell et al. .................... 277/467
3,604,096 A * 9/1971 Shiroma ...................... 29/235
3,674,689 A * 7/1972 Giltrow et al. ........... 428/298.7
4,081,890 A 4/1978 Bluhm et al.
4,527,806 A * 7/1985 Ungchusri et al. .......... 277/530
4,576,385 A * 3/1986 Ungchusri et al. .......... 277/562
4,967,959 A 11/1990 Wieczorek
5,199,722 A * 4/1993 Wada et al. ................. 277/434
5,199,871 A * 4/1993 Young ......................... 433/80
5,486,299 A * 1/1996 Fuwa et al. ................. 508/106
5,682,861 A 11/1997 Stockner et al.
5,752,487 A 5/1998 Harrell et al.
5,934,680 A * 8/1999 Kakehi et al. ............... 277/499
6,241,854 B1 * 6/2001 Frawley, Jr. ................. 162/371
6,349,459 B1 * 2/2002 Dean ........................... 29/235

(Continued)

FOREIGN PATENT DOCUMENTS

EP 1326022 B1 7/2003

(Continued)

*Primary Examiner*—Thomas N Moulis
(74) *Attorney, Agent, or Firm*—Ronald W. Wangerow; Harness, Dickey & Pierce, P.L.C.

(57) ABSTRACT

A fuel injector tip seal is provided including improved resistance to the heat and pressures of combustion gas. According to one aspect, the tip seal is formed from polytetrafluoroethylene and between 10 and 35 percent carbon fiber. The material offers improved surface finish and deformation resistance as well as improved thermal conduction and keeps thermal expansion low as compared to conventional fuel injector tip seal designs. According to a further aspect, a revised seal groove design is provided that allows for expansion and deformation of the tip seal and creates more pressure to the outside diameter face when pressure is applied at the tip. According to another aspect, the tip seal is formed of a flat disk-shaped seal body that can be assembled on the fuel injector by an assembly cone device that allows the disk-shaped seal body to be flipped to a ring-shaped configuration in its assembled position.

11 Claims, 3 Drawing Sheets

U.S. PATENT DOCUMENTS

| | | | | |
|---|---|---|---|---|
| 6,664,572 | B2 * | 12/2003 | Chatufale | 257/172 |
| 6,938,901 | B2 | 9/2005 | Tsuchiya et al. | |
| 7,004,476 | B2 * | 2/2006 | Nakayama et al. | 277/591 |
| 2003/0178784 | A1 * | 9/2003 | Nakayama et al. | 277/460 |
| 2004/0080115 | A1 * | 4/2004 | Tsuchiya et al. | 277/458 |
| 2005/0066942 | A1 * | 3/2005 | Ohkubo et al. | 123/470 |
| 2005/0109325 | A1 * | 5/2005 | Tomita | 123/470 |
| 2006/0011736 | A1 * | 1/2006 | Ricco et al. | 239/96 |
| 2007/0175451 | A1 * | 8/2007 | Beardmore | 123/470 |
| 2008/0122184 | A1 * | 5/2008 | Hocker et al. | 277/366 |

FOREIGN PATENT DOCUMENTS

| | | | |
|---|---|---|---|
| EP | 1701033 | A1 | 9/2006 |

* cited by examiner

GAS DIRECT INJECTOR TIP SEAL

FIELD

The present disclosure relates to gas direct injector tip seals and more particularly, to injector tip seals that are subjected to combustion gasses.

BACKGROUND AND SUMMARY

The statements in this section merely provide background information related to the present disclosure and may not constitute prior art.

Fuel injector tip seals are commonly provided at the interface between the fuel injector and an aperture in the head of the engine through which the fuel injector extends for injecting fuel directly into the cylinders of the engine. The fuel injector tip seals are subjected to compression temperatures and pressure which create design concerns relating to the life span of the seals.

The present disclosure provides fuel injector tip seal designs that are intended to improve the durability of the tip seal. According to one aspect of the present disclosure, a tip seal is provided including a ring-shaped body formed of polytetrafluoroethylene that includes between 10 and 35 percent carbon. The carbon filled PTFE provides improved surface finish and deformation resistance and improved thermal conduction and reduced thermal expansion, as compared to current injector tip seals which use approximately 20 percent glass bead filled PTFE or 25 percent glass fiber filled PTFE.

According to another aspect of the present disclosure, the fuel injector assembly is provided with an elongated injector body having a fuel passage extending therethrough and terminating at a tip thereof. The injector body includes a recessed groove in an outer diameter thereof having a first radially extending end wall and a second radially extending end wall spaced from the first end wall by a first distance. The first end wall is disposed in closer proximity to the tip than the second end wall and a continuously sloped axially extending recessed base wall surface extends from the first end wall to the second end wall such that a first end of the continuously sloped axially extending surface adjacent to the first wall has a smaller diameter than a second end of said continuously sloped axially extending surface adjacent to said second end wall. A ring-shaped seal body is disposed in the recessed groove. The slope of the base wall of the groove creates more pressure to the outside diameter face of the seal body when pressure is applied at the tip. The groove diameter is provided so that an increased axial clearance is provided between the end walls of the groove and the end walls of the ring-shaped seal body to allow for PTFE expansion and deformation at increased temperatures.

According to a further aspect of the present disclosure, a fuel injector tip seal is provided including a seal body having an uninstalled flat disk-shape with a pair of sidewalls having an aperture centrally located therein and a radial dimension extending radially from said central aperture to an outer periphery. The seal body is inserted in a recessed groove in the injector body with the pair of sidewalls being flipped so as to be disposed such that the radial dimension of the pair of sidewalls extend axially relative to the elongated injector body. A cone-shaped assembly tool can be utilized to assist in sliding the seal body onto the fuel injector body and into the recessed groove. The disk-shaped seal body provides a significant reduction in cost for both material and labor by eliminating the machining that is required for conventional seal designs.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
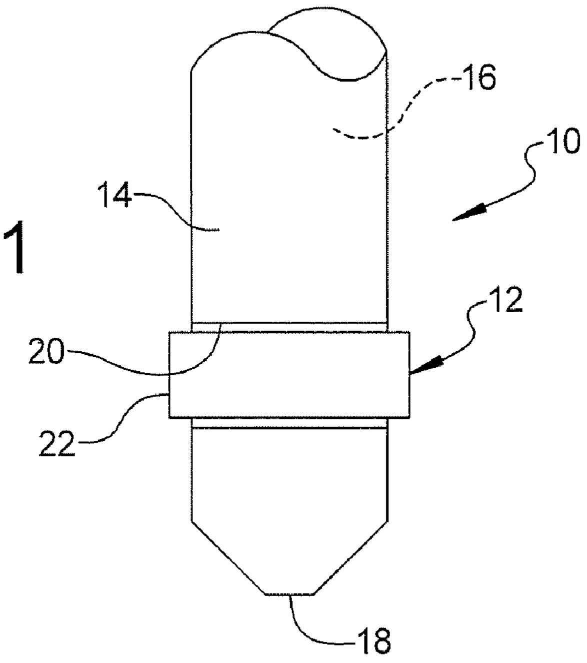
FIG. 1 is a side view of a fuel injector having a tip seal according to the principles of the present disclosure.

The following description is merely exemplary in nature and is not intended to limit the present disclosure, application, or uses. It should be understood that throughout the drawings, corresponding reference numerals indicate like or corresponding parts and features.

Figure 2A:
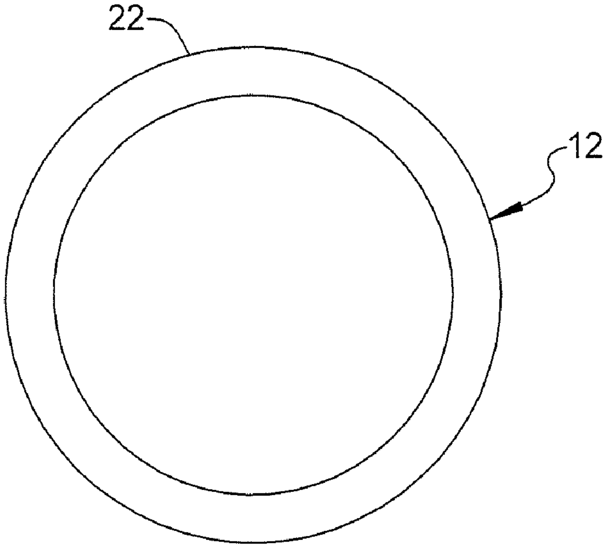
FIG. 2A is an end view of tip seal according to the principles of the present disclosure.
Figure 2B:
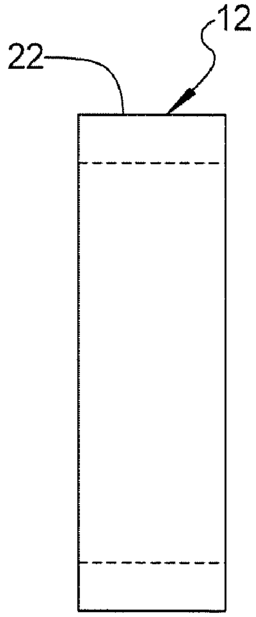
FIG. 2B is a side view of the tip seal shown in FIG. 2A.

With reference to FIGS. 1, 2A, and 2B, a fuel injector assembly 10 incorporating a tip seal 12, according to the principles of the present disclosure, will now be described. The fuel injector assembly 10 includes an elongated injector body 14 having a fuel passage 16 extending therethrough and terminating at a tip 18 thereof. The injector body 14 includes a recessed groove 20 in an outer diameter thereof. The tip seal 12 includes a ring shaped seal body 22 formed of polytetrafluoroethylene (PTFE) and including between 20 and 35 percent graphitized carbon, and more preferably, approximately 25 percent graphitized carbon. As compared to current tip seal designs that utilized approximately 20 percent glass bead filled PTFE or approximately 25 percent fiber filled PTFE, the tip seal 12 of the present disclosure having graphitized carbon filled PTFE offers improved thermal conduction (from 0.3 W/m*K to 0.68 W/m*K) and keeps thermal expansion low, thereby providing improved tip seal durability with improved finish and deformation resistance.

Figure 3:
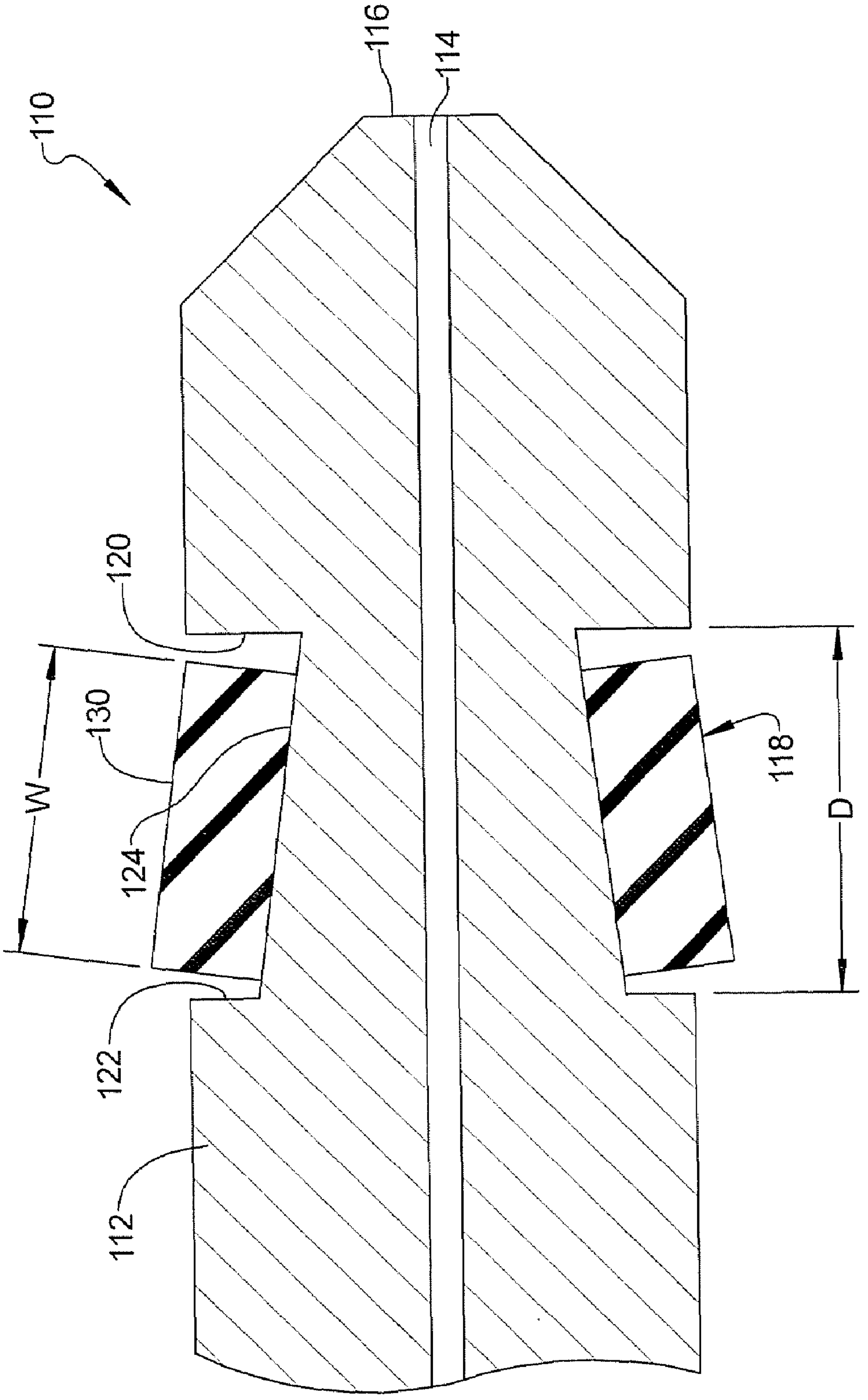
FIG. 3 is a cross-section sectional view of a fuel injector assembly according to a second embodiment of the present disclosure.

According to another aspect of the present disclosure, as illustrated in FIG. 3, a fuel injector assembly 110 is shown including an elongated injector body 112 having a fuel passage 114 extending therethrough and terminating at a tip 116 thereof. The injector body includes a recessed groove 118 in an outer diameter thereof. The recessed groove 118 has a first radially extending end wall 120 and a second radially extending end wall 122 spaced from the first end wall by a distance D. The first end wall 120 is disposed in closer proximity to the tip 116 than the second end wall 122. A continuously sloped axially extending base wall surface 124 extends from the first end wall 120 to the second end wall 122 such that a first end of the continuously sloped axially extending base wall surface, adjacent to the first end wall has a smaller diameter than a second end of said continuously sloped axially extending surface adjacent to the second end wall 122, thus, the continuously sloped axially extending surface had a generally conical shape. A ring-shaped seal body 130 is disposed in the recessed groove 118. The seal body 130 can be made from PTFE and can be filled with graphitized carbon or known fillers such as glass fiber and glass beads. The ring-shaped seal body 130 has an axial width W that is smaller than the distance D between the first and second end walls 120,122 of the recessed groove 118 such that an axial clearance is provided to allow for PTFE expansion and deformation at increased temperatures. The axial clearance allows gas to flow in to the cavity between the seal and side wall of the groove. The axial clearance between the end walls 120, 122 and the ends of the seal body should be sufficient to accommodate for the PTFE expansion and deformation without providing unnecessary stresses or strains on the seal body. The continuously sloped base wall surface 124 creates pressure to the outside diameter face of the seal body when pressure is applied at the tip 116 of the fuel injector 112, thus enhancing the sealing capabilities.

Figure 4:
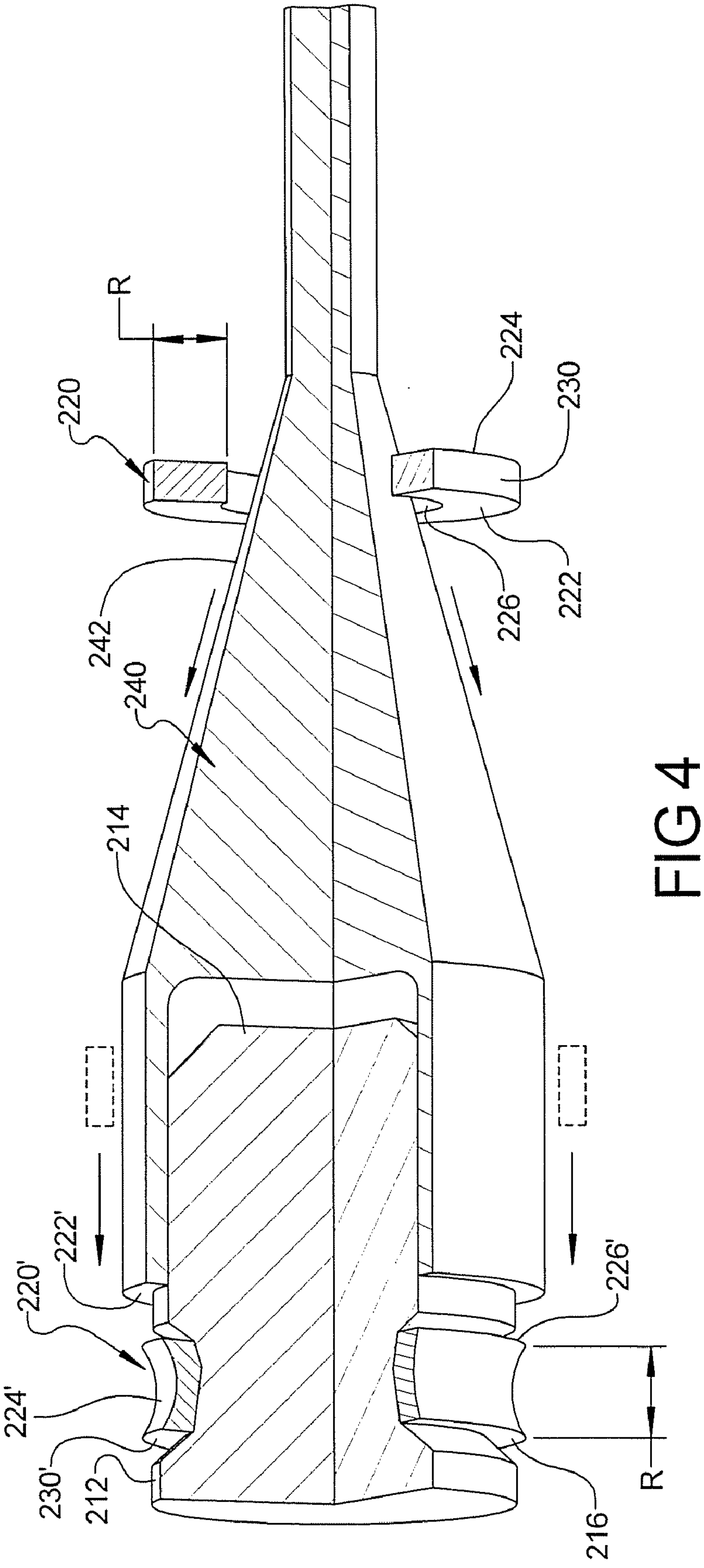
FIG. 4 is a perspective view illustrating the assembly of a tip seal onto a fuel injector according to the principles of the present disclosure.

With reference to FIG. 4, a still further embodiment of the present disclosure will now be described. In FIG. 4, an elongated injector body 212 is shown and includes a fuel passage extending therethrough and terminating at a tip 214 thereof. The injector body includes a recessed groove 216 in an outer diameter thereof. A seal body 220 having an uninstalled flat disk shape is illustrated at a rightward position within FIG. 4. The seal body 220 has a circular shape with a pair of sidewalls 222, 224 having an aperture 226 centrally located therein and a radial dimension "R" extending radially from the central aperture 226 to an outer periphery 230 of the circular seal body 220. The seal body 220 is inserted in the recessed groove 216 of the injector body 212 with the pair of sidewalls 222, 224 being "flipped" so as to be disposed such that the radial dimension R of the pair of sidewalls extends axially relative to the elongated injector body 212. Thus, in the installed position within the recessed groove 216 of the injector body 212, the seal body 220' is deformed such that the surface forming the central aperture 226 and the surface forming the outer periphery 230 now form the axial ends 226', 230' of the deformed seal body 220'. Furthermore, the sidewalls 222, 224 of the uninstalled seal body 220 now form the inside diameter wall 222' and outside diameter wall 224' of the installed seal body 220'. An installation tool 240 can be utilized for installing the seal body 220 onto the injector body 212, as illustrated in FIG. 4. The cone-shaped installation tool 240 can be disposed against the tip 214 of the injector body 212 and the disk-shaped seal body 220 is slid up the cone-shaped surface 242 of the tool 240 until the seal body 220 slides off the end 244 of the tool 240 and into the recessed groove 216 on the injector body 212. With this design, a significant reduction in cost for both material and labor is achieved since no machining of the seal body is required and installation of the seal onto the tip is simplified.

What is claimed is:

1. An injector tip seal, comprising:

a ring shaped body formed of between 10 and 35 percent carbon and the remainder being polytetrafluoroethylene.

2. The injector tip seal according to claim 1, wherein said ring shaped body includes approximately 25 percent carbon.

3. A fuel injector assembly, comprising:

an elongated injector body having a fuel passage extending therethrough and terminating at a tip thereof, said injector body including a recessed groove in an outer diameter thereof; and a ring shaped seal body formed of between 10 and 35 percent carbon and the remainder being polytetrafluoroethylene, said ring shaped seal body disposed in said recessed groove.

4. The fuel injector assembly according to claim 3, wherein said ring shaped seal body includes approximately 25 percent carbon.

5. A fuel injector assembly, comprising:

an elongated injector body having a fuel passage extending therethrough and terminating at a tip thereof, said injector body including a recessed groove in an outer diameter thereof, said recessed groove having a first, radially extending, end wall and a second, radially extending, end wall spaced from said first end wall by a first distance, said first end wall being disposed in closer proximity to said tip than said second end wall, and a continuously sloped axially extending base wall surface extending from said first end wall to said second end wall such that a first end of said continuously sloped axially extending base wall surface, adjacent to said first end wall, has a smaller diameter than a second end of said continuously sloped axially extending surface, adjacent to said second end wall; and a ring shaped seal body disposed in said recessed groove.

6. The fuel injector assembly according to claim 5, wherein said ring shaped seal body has an axial width that is smaller than said first distance.

7. The fuel injector assembly according to claim 5, wherein said ring shaped seal body is made from polytetrafluoroethylene.

8. A fuel injector assembly, comprising:

an elongated injector body having a fuel passage extending therethrough and terminating at a tip thereof, said injector body including a recessed groove in an outer diameter thereof; and a seal body having an uninstalled flat disc-shape with a pair of side walls having an aperture centrally located therein and a radial dimension extending radially from said central aperture to an outer periphery, said seal body being inserted in said recessed groove with said pair of sidewalls being flipped so as to be disposed such that said radial dimension of said pair of side walls extends axially relative to said elongated injector body.

9. The fuel injector assembly according to claim 8, wherein said seal body is formed of polytetrafluoroethylene.

10. A method of installing a seal on a fuel injector body having a fuel passage extending therethrough and a recessed groove in an outer diameter thereof, comprising:

a sliding seal body, having an uninstalled flat disc-shape with a pair of side walls having an aperture centrally located therein and a radial dimension extending radially from said central aperture to an outer periphery, over an end of said fuel injector body into said recessed groove while simultaneously flipping said pair of sidewalls so as to be disposed such that said radial dimension of said pair of side walls extends axially relative to said elongated injector body.

11. The method according to claim 10, wherein said sliding a seal body includes sliding the seal body along an assembly cone disposed against a tip of the fuel injector body.

* * * * *

UNITED STATES PATENT AND TRADEMARK OFFICE
CERTIFICATE OF CORRECTION

PATENT NO. : 7,640,917 B2
APPLICATION NO. : 11/766497
DATED : January 5, 2010
INVENTOR(S) : Raymond L. Szparagowski and Gregory J. Daniel It is certified that error appears in the above-identified patent and that said Letters Patent is hereby corrected as shown below:

On the Title page:

In line 4 of the Abstract after "10 and 35 percent carbon," the word --fiber-- should be deleted.

Signed and Sealed this

Twenty-third Day of November, 2010

David J. Kappos
*Director of the United States Patent and Trademark Office*